United States Patent [19]

Hendriks

[11] 4,332,575
[45] Jun. 1, 1982

[54] COMPOSITE DRIVING BELT

[75] Inventor: Emery F. M. Hendriks, Heeze, Netherlands

[73] Assignee: Van Doorne's Transmissie B.V., Tilburg, Netherlands

[21] Appl. No.: 116,656

[22] Filed: Jan. 29, 1980

[30] Foreign Application Priority Data

Jan. 30, 1979 [NL] Netherlands ............... 7900707

[51] Int. Cl.³ .................................. F16G 1/26
[52] U.S. Cl. ...................... 474/201; 474/242; 474/272
[58] Field of Search ............... 474/201, 242, 272

[56] References Cited

U.S. PATENT DOCUMENTS

| 492,880 | 3/1893 | Todd | 474/272 |
|---|---|---|---|
| 1,321,686 | 11/1919 | Varden | 474/272 |
| 2,920,494 | 1/1960 | Dodwell | 474/272 |
| 3,720,113 | 3/1973 | Van Doorne et al. | 474/242 |
| 4,080,841 | 3/1978 | Vollers | 474/201 |

Primary Examiner—C. J. Husar
Assistant Examiner—Conrad Berman
Attorney, Agent, or Firm—Cushman, Darby & Cushman

[57] ABSTRACT

A composite driving belt in the form of an endless flexible carrier on which is mounted a plurality of plate-like elements disposed transverse to the carrier. The carrier is formed by a plurality of endless metal bands arranged in overlying concentric relationship, at least one side of at least one of the bands having surface roughness produced, for example, by two series of fine grooves which cross each other.

6 Claims, 2 Drawing Figures

COMPOSITE DRIVING BELT

This invention relates to a composite driving belt of the kind comprising a flexible endless carrier on which is mounted a plurality of transverse plate-like elements. The invention relates especially to the structure of the endless carrier and to a method for making the carrier.

BACKGROUND

A known form of driving belt comprises an endless flexible metal carrier on which is mounted a plurality of plate-like elements disposed transverse to the carrier and in face-to-face contact with each other. The carrier is formed of one or more band packages each of which includes a plurality of endless bands arranged in overlying concentric relationship, i.e. arranged radially around each other. Belts of this kind are disclosed in U.S. Pat. Nos. 3,720,113 and 4,080,841.

Belts of this kind have utility in variable ratio transmissions in which the belt runs over pulleys constructed of conical discs which are adapted to be displaced axially relative to each other so that the running diameter of the driving belt over the pulleys may vary. In practice, such a driving belt is under high tension in order to ensure a proper frictional contact between the pulleys and the transverse belt elements, and to properly conduct the transverse elements in the straight part of the belt.

The efficiency of such a driving belt is rather high, but there remain internal losses in the belt as a result of frictional forces between the various parts.

SUMMARY OF THE INVENTION

It is the broad object of the invention to provide an endless carrier for the kind of driving belt described above in which at least one side of at least one of the endless bands forming the carrier has a surface profiling. Thus, the mutual friction between the bands disposed around each other is decreased, and this appears to have an efficiency increase. When the driving belt runs over the pulleys having different running diameters, the individual bands of the band package have a mutual speed difference, at least in situ of one of the pulleys. This speed difference may in practice be more than 1 meter per second between two successive bands, that is between one band and the overlying or underlying band. Moreover, notably the inner bands are pressed onto each other with substantial force, since the pressure force on a given band is built up by all bands disposed around that band.

By providing, in particular, the more inwardly disposed bands at least at one side with a surface profiling, through which an improved lubrication between the bands will be produced, an improvement in efficiency occurs.

Preferably, according to the invention, the surface profiling comprises parallel grooves.

According to a further feature of the invention, the roughing value of the surface profiling lies between 0.30 and 0.75 $\mu$m Ra (measured according to CLA method) and preferably between 0.45 and 0.55 $\mu$m Ra. The CLA (Centerline Average) method is defined as follows:

$$Ra = \frac{1}{l} \int_{x=0}^{x=l} h_i \, dx$$

in which formula $h_i$ is the distance between the measured profile and the zero reference line (average line) along a line from $x=0$ to $x=l$.

In a preferred embodiment of the invention, the grooves are disposed in two series of grooves, the grooves in one series being crosswise to the grooves in the other series. A good result is achieved when the metal bands are provided with the surface profiling only at the radial inner side.

Furthermore, the invention relates to a method of applying a surface profiling on the radial inner side of an endless metal band. According to this feature of the invention, the metal band is rolled between rollers, one roller having a profiled circumferential surface. Preferably the profile is formed by a plurality of grooves, which may be arranged in two series crosswise to each other.

DETAILED DESCRIPTION

Figure 1:
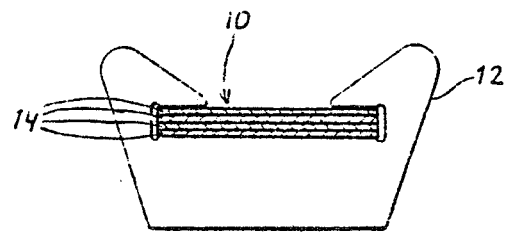
FIG. 1 is a transverse sectional view of a driving belt.

FIG. 1 illustrates a driving belt having a carrier 10 on which are slidably mounted a plurality of plate-like elements 12 arranged transverse to the carrier 10 and in face-to-face contact with each other. The elements 12 as is conventional are generally trapezoid shaped in order that the belt will fit in a V-shaped pulley groove.

The carrier 10 in the illustrated embodiment is formed of a plurality, for example, four flexible endless bands 14 arranged in overlying concentric relationship. The width of each band 14 may e.g. range between 5 and 20 mm and the thickness between 0.15 and 0.25 mm. The diameter of the band (in a circular condition) may e.g. range between 150 and 300 mm.

Figure 2:
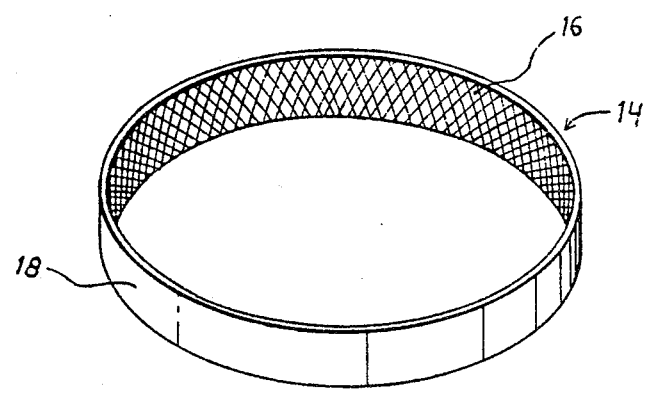
FIG. 2 is a perspective view of an endless band used in the construction of the belt of FIG. 1.

At least one of the bands 14 has at least one of its sides profiled. In the embodiment illustrated in FIG. 2, the inner side is provided with a surface profiling formed by two series of parallel grooves 16 (diagrammatically shown), the grooves of one series being crosswise of the grooves of the other series. The exterior surface 18 of the belt 14 is smooth.

What is claimed is:

1. An endless flexible carrier for a driving belt of the kind having a plurality of plate-like elements slidably mounted on the carrier comprising a plurality of endless metal bands disposed radially around and in sliding contact with each other such that in use there is a mutual speed different between bands, at least one of said bands, at least at one side, being provided with a surface profiling which decreases friction between the bands.

2. A driving belt carrier as in claim 1 wherein the surface profiling comprises grooves.

3. A driving belt carrier as in claim 2 wherein the grooves are disposed crosswise of each other.

4. A driving belt carrier as in any one of claims 1, 2 or 3 wherein the roughing value of the surface profiling ranges between 0.30 and 0.75 $\mu$m Ra (measured according to the CLA method) and preferably between 0.45 and 0.55 $\mu$m Ra.

5. A driving belt comprising a carrier as in claim 1 and a plurality of plate-like elements mounted on said carrier transverse thereto and in abutting relationship to each other.

6. A driving belt carrier as in any one of claims 1, 2 or 3 wherein at least one metal band, other than the inner band, is provided at the radial interior side with the surface profiling.

* * * * *